US010233621B2

(12) United States Patent
Park

(10) Patent No.: US 10,233,621 B2
(45) Date of Patent: Mar. 19, 2019

(54) SMART WATER SUPPLY VALVE SYSTEM AND METHOD FOR CONTROLLING SAME

(71) Applicant: LG ELECTRONICS INC., Seoul (KR)

(72) Inventor: Jongseok Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/568,237

(22) PCT Filed: Apr. 30, 2015

(86) PCT No.: PCT/KR2015/004382
§ 371 (c)(1),
(2) Date: Oct. 20, 2017

(87) PCT Pub. No.: WO2016/171306
PCT Pub. Date: Oct. 27, 2016

(65) Prior Publication Data
US 2018/0148912 A1 May 31, 2018

(30) Foreign Application Priority Data
Apr. 21, 2015 (KR) .................. 10-2015-0055868

(51) Int. Cl.
F16K 31/02 (2006.01)
E03C 1/05 (2006.01)
(Continued)

(52) U.S. Cl.
CPC ............... E03C 1/057 (2013.01); E03C 1/04 (2013.01); E03C 1/05 (2013.01); F16K 31/02 (2013.01);
(Continued)

(58) Field of Classification Search
CPC .......... F16K 31/02; F16K 31/05; F16K 37/00; F16K 37/005; E03C 1/057; E03C 1/04; E03C 1/05
(Continued)

(56) References Cited

U.S. PATENT DOCUMENTS 4,972,070 A * 11/1990 Laverty, Jr. ............. E03C 1/057
250/221
5,033,508 A * 7/1991 Laverty, Jr. ............. E03C 1/057
137/624.11
(Continued)

FOREIGN PATENT DOCUMENTS

JP 2001-207499 A 8/2001
JP 2002-81109 A 3/2002
(Continued)

Primary Examiner — Minh Le
(74) Attorney, Agent, or Firm — Birch, Stewart, Kolasch & Birch, LLP

(57) ABSTRACT

A smart water supply valve system according to an embodiment of the present invention comprises an inflow unit for being supplied with water through one or more pipes; a valve for allowing/suspending the flow of water input through the inflow unit; a first sensing unit for sensing the pressure or flow rate of water unit input through the input unit; a second sensing unit for sensing at least one of the movement, the shape, and the heat distribution of an object; a controller for controlling the amount of opening/closing of the valve or the flow rate of water on the basis of sensing outputs from the first and second sensing units; and an outflow unit for discharging water supplied from the pipe.

17 Claims, 14 Drawing Sheets (a)

(a)

(b)

(b)

(51) Int. Cl.
*E03C 1/04* (2006.01)
*F16K 37/00* (2006.01)

(52) U.S. Cl.
CPC .... *F16K 37/005* (2013.01); *E03C 2001/0418* (2013.01)

(58) Field of Classification Search
USPC .............................. 137/487.5, 553, 552, 554
See application file for complete search history.

(56) References Cited

U.S. PATENT DOCUMENTS

| | | | | |
|---|---|---|---|---|
| 5,199,118 A * | 4/1993 | Cole | ........................ | A47K 1/04 4/619 |
| 5,819,336 A * | 10/1998 | Gilliam | .................. | E03C 1/057 4/623 |
| 6,321,785 B1 * | 11/2001 | Bergmann | .............. | E03C 1/057 137/606 |
| 6,513,787 B1 * | 2/2003 | Jeromson | ................ | E03C 1/057 137/559 |
| 9,057,182 B1 * | 6/2015 | Friedman | .................. | E03C 1/18 |
| 9,335,297 B1 * | 5/2016 | Cummins | .............. | G01N 29/14 |
| 2005/0000015 A1 * | 1/2005 | Kaneko | .................. | E03C 1/057 4/623 |
| 2006/0231782 A1 * | 10/2006 | Iott | ........................ | E03C 1/057 251/129.04 |
| 2007/0001018 A1 * | 1/2007 | Schmitt | .................... | E03C 1/05 236/12.12 |
| 2008/0163942 A1 * | 7/2008 | Boey | ....................... | E03C 1/057 137/624.11 |
| 2008/0271238 A1 * | 11/2008 | Reeder | .................... | A46B 7/04 4/597 |
| 2009/0056011 A1 * | 3/2009 | Wolf | ....................... | E03C 1/057 4/623 |
| 2009/0154524 A1 * | 6/2009 | Girelli | ....................... | E03C 1/04 374/148 |
| 2011/0185493 A1 * | 8/2011 | Chen | ....................... | E03C 1/057 4/623 |
| 2012/0291886 A1 * | 11/2012 | Rivera | .................... | E03B 7/071 137/487.5 |
| 2013/0047327 A1 * | 2/2013 | Chiu | ....................... | E03D 5/105 4/415 |
| 2014/0115772 A1 * | 5/2014 | Janakiraman | ......... | E03C 1/0408 4/597 |
| 2014/0261749 A1 * | 9/2014 | Chen | ....................... | E03C 1/057 137/78.1 |
| 2015/0216369 A1 * | 8/2015 | Hamilton | ............. | A47K 5/1217 222/1 |
| 2015/0308084 A1 * | 10/2015 | Thompson | ......... | G05D 23/1393 700/283 |
| 2016/0060854 A1 * | 3/2016 | Chung | .................... | E03C 1/057 4/623 |
| 2016/0265200 A1 * | 9/2016 | Slothower | ............... | E03C 1/042 |
| 2016/0273198 A1 * | 9/2016 | Chung | .................... | E03C 1/057 |
| 2017/0215655 A1 * | 8/2017 | Ophardt | ............... | A47K 3/281 |
| 2017/0218608 A1 * | 8/2017 | Chen | ....................... | E03C 1/057 |
| 2017/0328048 A1 * | 11/2017 | Karei | ....................... | E03C 1/057 |
| 2018/0016773 A1 * | 1/2018 | Chandler | ................ | E03C 1/057 |
| 2018/0030699 A1 * | 2/2018 | Huang | .................... | E03C 1/057 |
| 2018/0058049 A1 * | 3/2018 | Seggio | .................... | E03C 1/057 |
| 2018/0119396 A1 * | 5/2018 | Huang | .................... | E03C 1/0412 |

FOREIGN PATENT DOCUMENTS

| | | |
|---|---|---|
| JP | 2013-7245 A | 1/2013 |
| JP | 2013-217089 A | 10/2013 |
| KR | 20-2013-0006932 U | 12/2013 |

* cited by examiner

FIG. 2.a
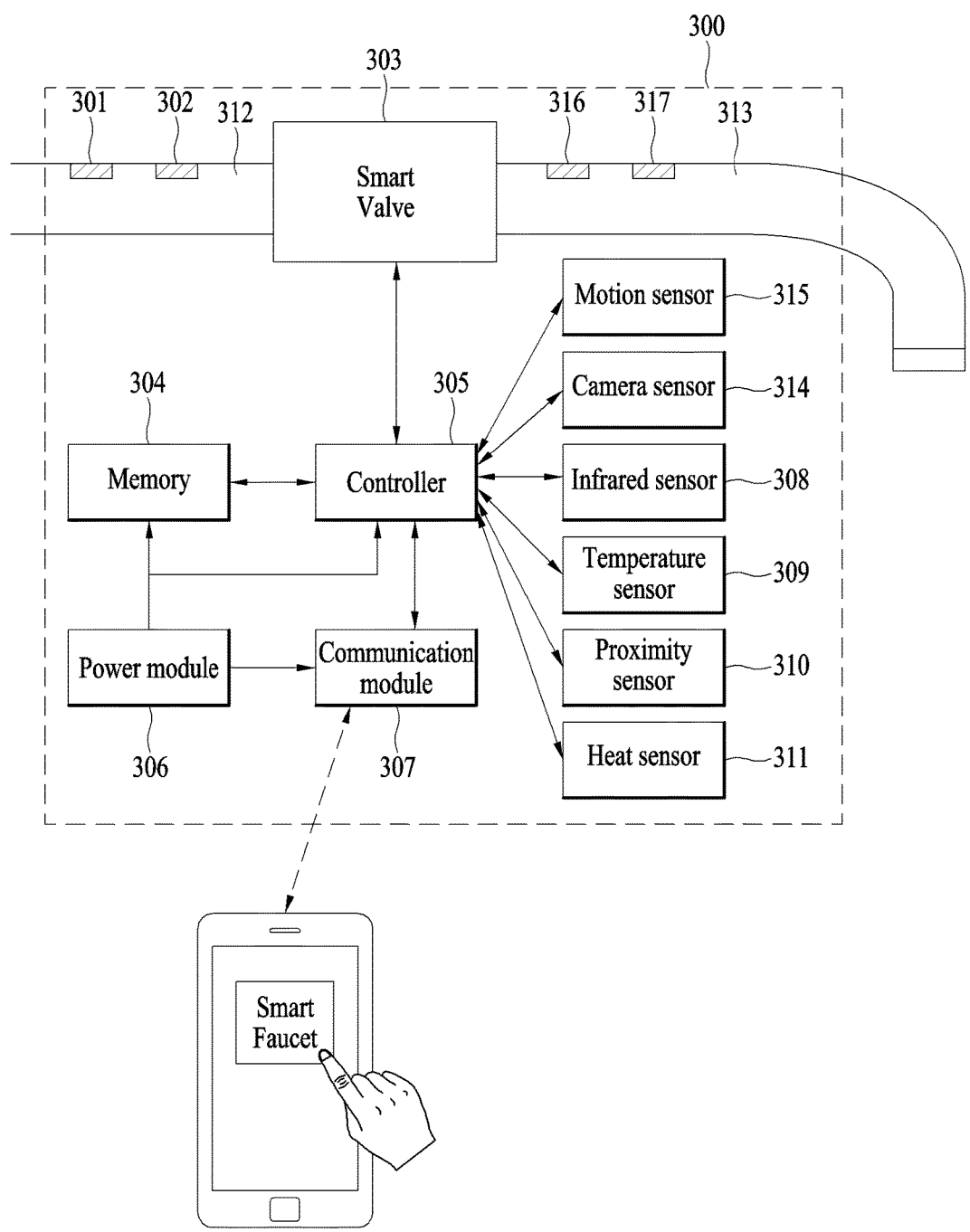

FIG. 3
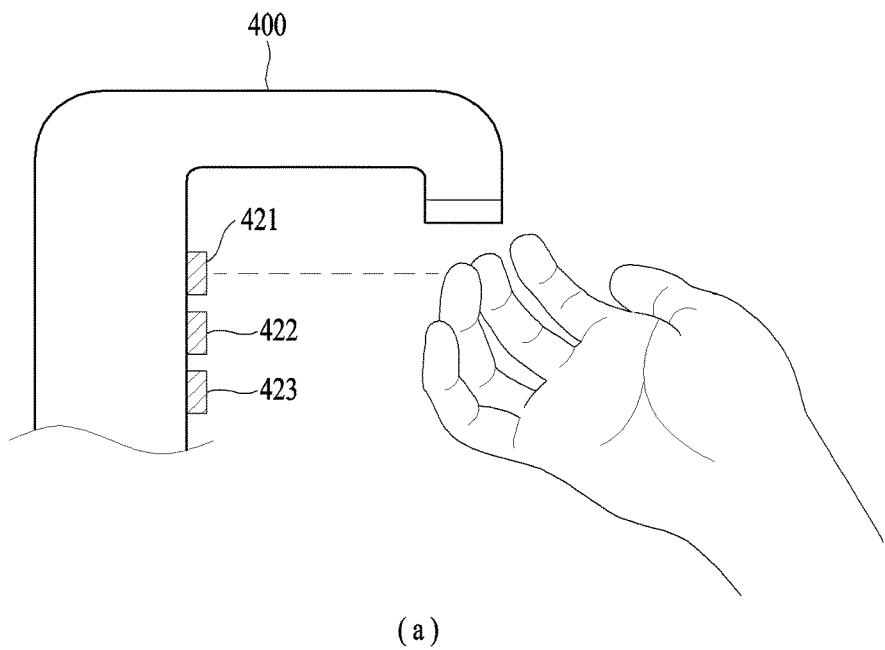
(a)
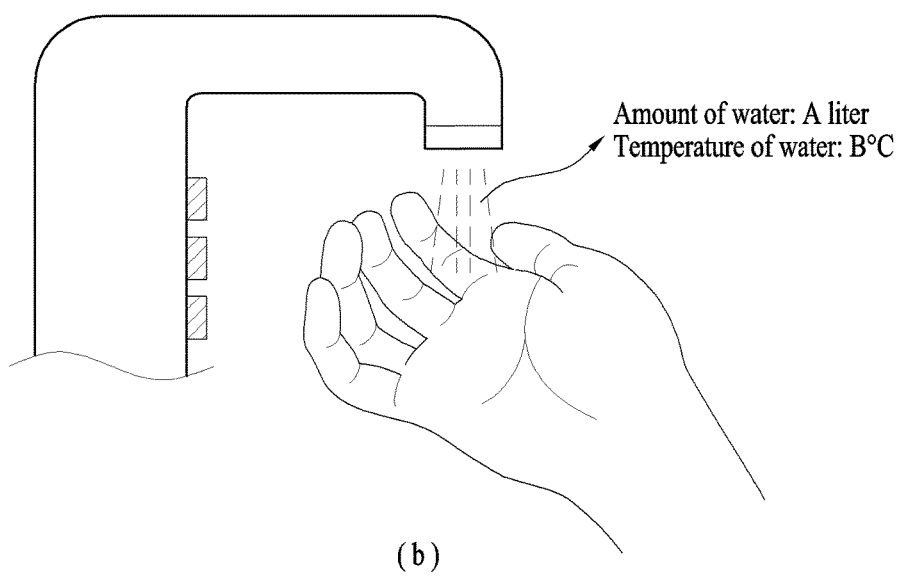
(b)

FIG. 4
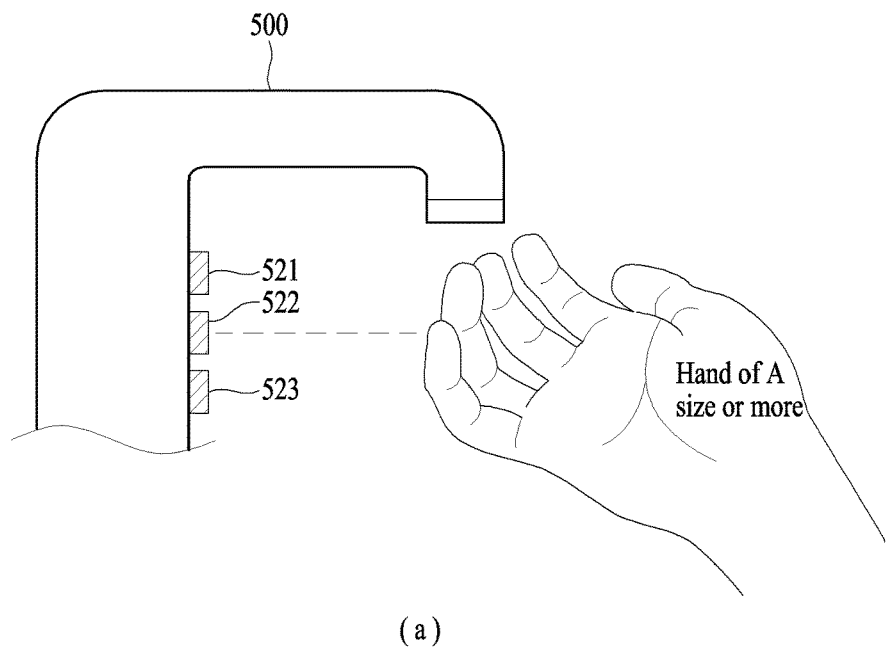
(a)
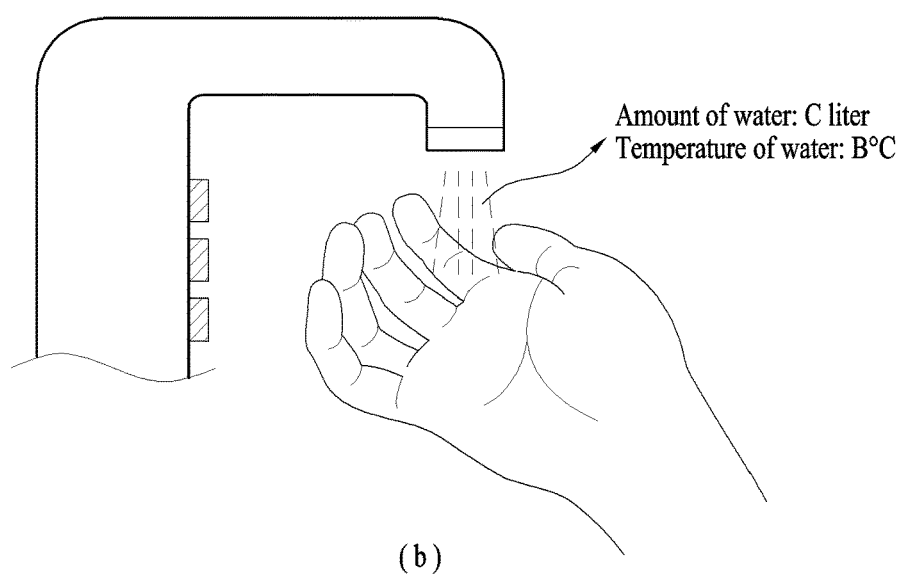
(b)

FIG. 5
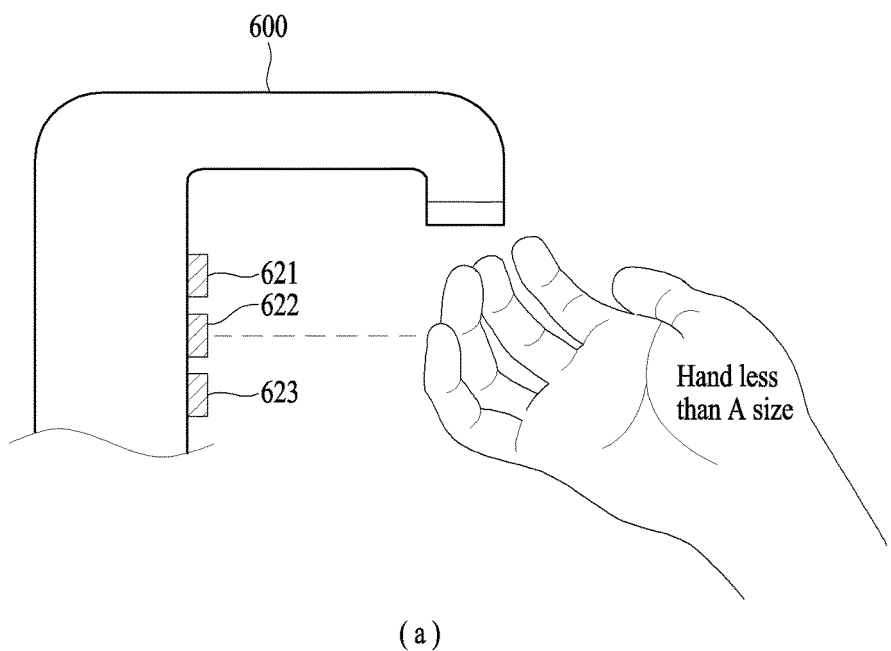
(a)
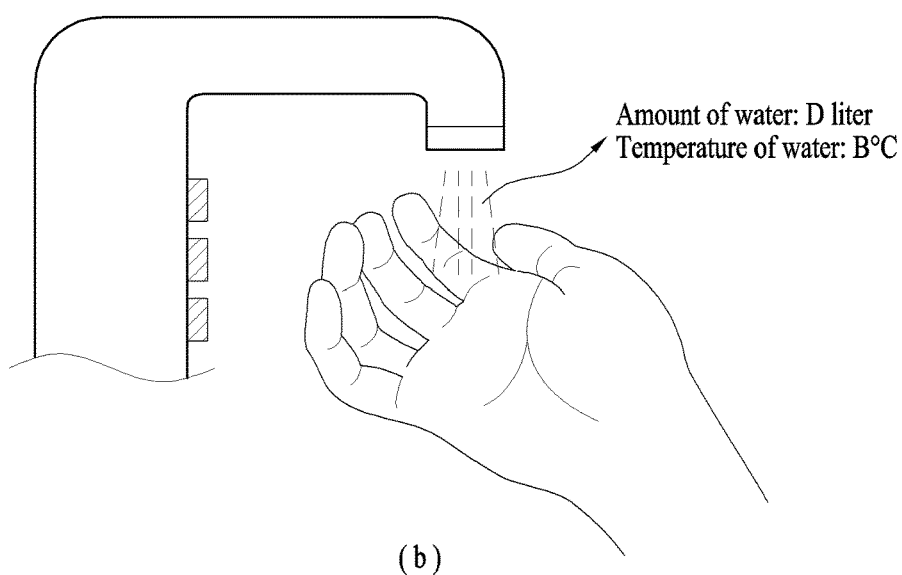
(b)

FIG. 6
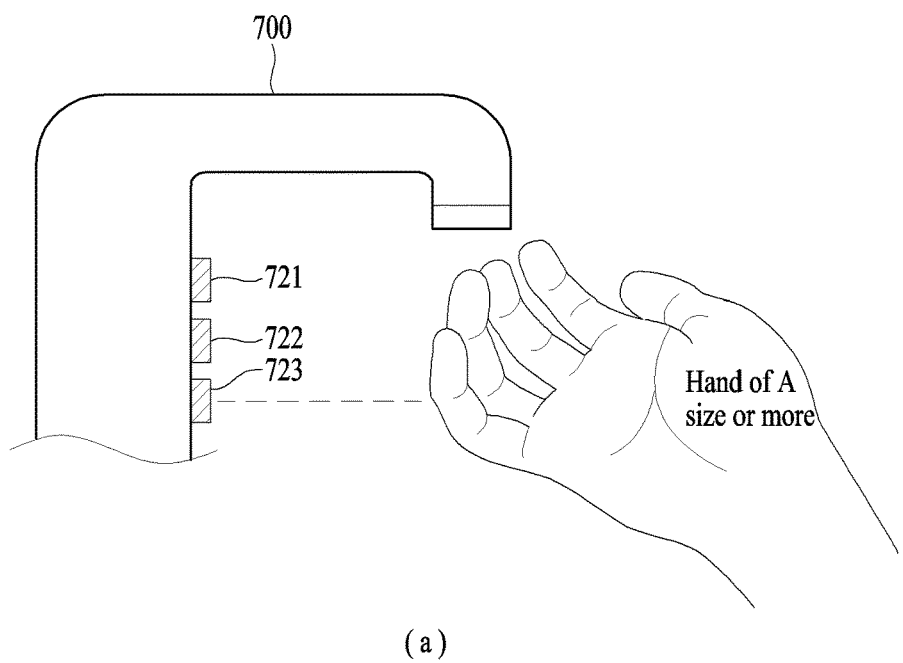
(a)
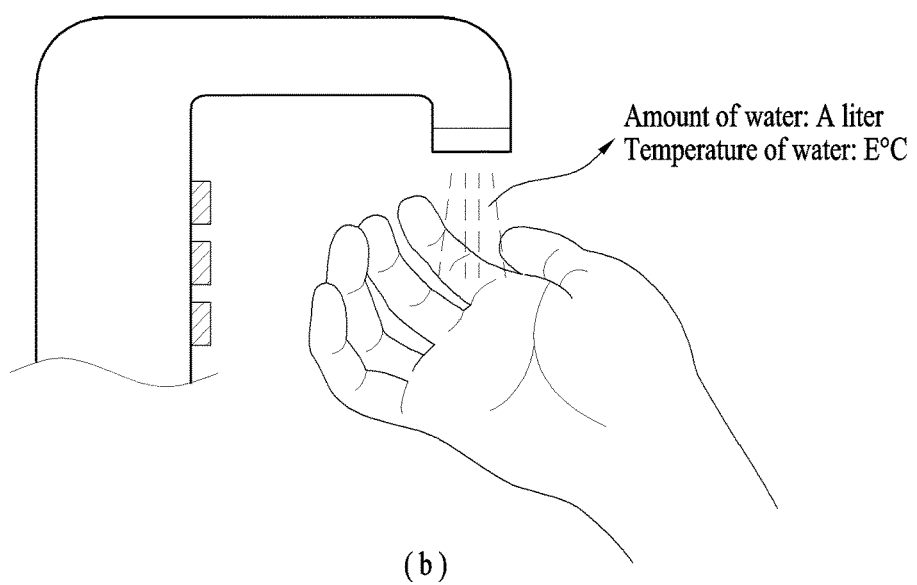
(b)

FIG. 7
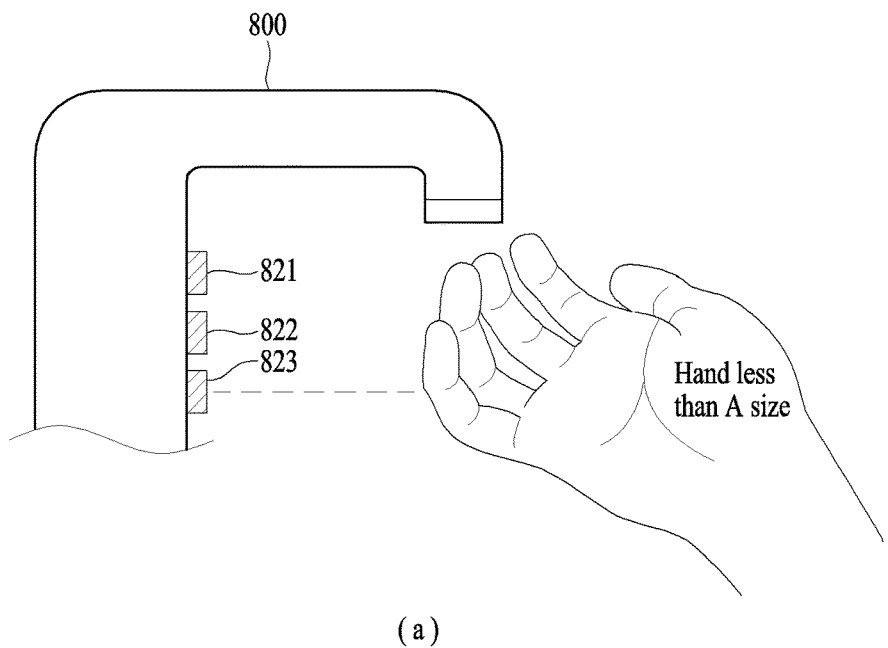
(a)
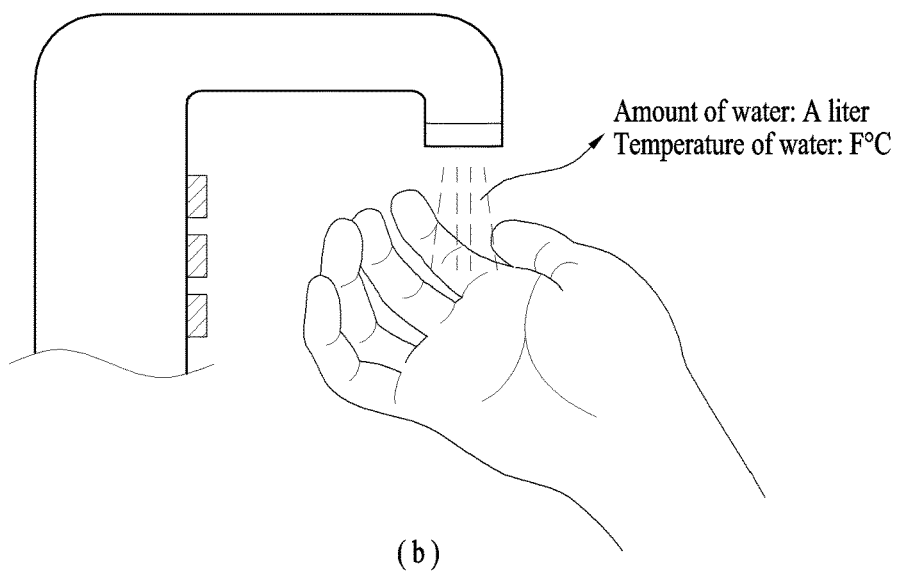
(b)

(a)            (b)

FIG. 12
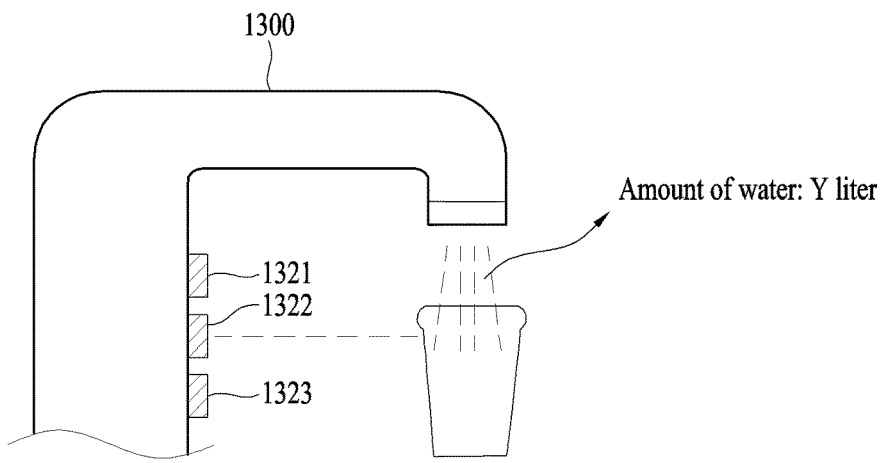
(a)
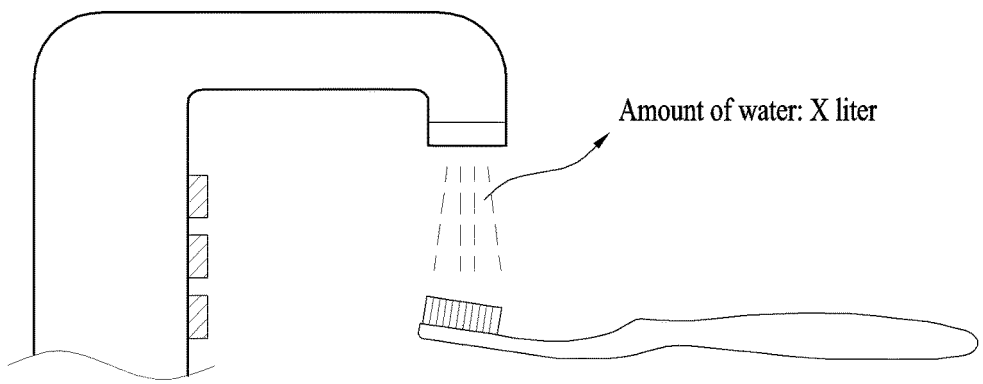
(b)

SMART WATER SUPPLY VALVE SYSTEM AND METHOD FOR CONTROLLING SAME

TECHNICAL FIELD

The present invention relates to a smart water supply valve system, and more particularly, to a smart water supply valve system and a method for controlling the same. For example, the present invention is a technology applicable to all water supply valve systems fixed to a wash stand, a bathtub, a toilet or kitchen sink provided in homes or public facilities.

BACKGROUND ART

FIG. 1 is a cross-sectional view illustrating a water supply valve system according to the related art. The water supply valve according to the related art is connected to an inlet 210 and an outlet 240, and may manually control the amount of water by means of a valve 220. There is a latch 211 for opening or closing a lock plate 215 by controlling the valve 220. Moreover, a lock plate fastening screw 217 is designed at a lower end of the lock plate 215.

A water supply valve system which has been recently introduced is designed such that an infrared sensor is fixed to a position near a faucet to allow water to be automatically flown for a certain time period as far as a user approaches thereto.

However, this related art water supply valve system has caused waste of unnecessary water by allowing a user to manually manipulate to control the amount of water or flowing water for a certain time period in accordance with a signal sensed by the infrared sensor. That is, the water supply valve system of the related art has a problem in that it fails to automatically and variably supply the appropriate amount of water in response to various conditions having different water pressures and various requests of users.

DISCLOSURE

Technical Problem

An object of the present invention according to one embodiment devised to solve the aforementioned problem is to provide a system that may drain water by optimizing the amount of water output from a water supply valve system in accordance with intention of a user.

Another object of the present invention according to another embodiment devised to solve the aforementioned problem is to provide a system that may automatically control a switching rate of a valve and a flow rate of water on the basis of information (for example, motion, shape, heat distribution, etc.) of an object which is sensed. The object may include a human body, a water cup, tableware or toothbrush.

Technical Solution

A smart water supply valve system according to one embodiment of the present invention comprises an inlet supplied with water through one or more pipes; a valve for opening or closing water input through the inlet; a first sensing unit for sensing a pressure or flow rate of water input through the inlet; a second sensing unit for sensing at least one or more of motion, shape and heat distribution of an object; a controller for controlling a switching rate of the valve or a flow rate of water on the basis of an output sensed from the first sensing unit and the second sensing unit; and an outlet for discharging water supplied from the pipe.

The first sensing unit includes at least one of a pressure sensor and a flow rate sensor. Moreover, the pressure sensor or the flow rate sensor is installed in at least one of the inlet, the outlet or the valve, through which water passes.

The second sensing unit includes at least one or more of an infrared sensor, a temperature sensor, a proximity sensor, a heat sensor and a camera. The infrared sensor, the temperature sensor, the proximity sensor, the heat sensor or the camera is installed near the outlet through which water is discharged.

Moreover, the controller determines a user mode in accordance with the output of the second sensing unit, and variably controls a switching rate of the valve or a flow rate of water in accordance with the user mode.

The smart water supply valve system according to another embodiment of the present invention further comprises a power module for supplying a power source to the valve, the first sensing unit, the second sensing unit or the controller. And, the smart water supply valve system according to still another embodiment of the present invention further comprises a communication module for receiving a control command from the outside or transmitting internal data to the outside.

The inlet further includes a hot water inlet supplied with hot water from the pipe, a cool water inlet supplied with cool water from the pipe, a mixing water unit where the hot water and the cool water are mixed with each other, and a temperature sensor installed in the mixing water unit to measure a temperature of the mixing water.

The smart water supply valve system according to another embodiment of the present invention further comprises a display module for displaying a switching rate of the valve, a flow rate of water, a temperature of water, or a user mode, further comprises a valve electric driving module for performing a switching operation of the valve, and further comprises a manual switching module for manually switching the valve.

The controller provides a function that may previously reserve and set the amount and temperature of water discharged through the outlet. Also, the communication module receives information that may previously reserve and set the amount and temperature of water, from a mobile device.

A method for controlling a smart water supply valve system according to one embodiment of the present invention comprises the steps of sensing that water enters an inlet; sensing a pressure or flow rate of the water entering the inlet; sensing at least one of motion, shape and heat distribution of an object; selecting a switching rate of the valve of a flow rate of water on the basis of the sensed output; and variably controlling the switching rate or switching time of the valve in accordance with the selected result.

Advantageous Effects

According to one embodiment of the present invention, a system, which solves the problem of the related art and may drain water by optimizing the amount of water output from a water supply valve system in accordance with intention of a user, is provided.

According to another embodiment of the present invention, a system, which solves the problem of the related art and may automatically control a switching rate of a valve and a flow rate of water on the basis of information (for example, motion, shape, heat distribution, etc.) of a sensed object, is provided, whereby water may be prevented from being unnecessarily wasted.

BRIEF DESCRIPTION OF THE DRAWINGS

FIG. 3 is a diagram illustrating an operation of a smart water supply valve system according to one embodiment of the present invention.

FIGS. 4 and 5 are diagrams illustrating an operation of a smart water supply valve system according to another embodiment of the present invention.

FIGS. 6 and 7 are diagrams illustrating an operation of a smart water supply valve system according to other embodiment of the present invention.

FIG. 12 is a diagram illustrating a process of controlling water in accordance with an object recognized in a smart water supply valve system according to still another embodiment of the present invention.

BEST MODE FOR CARRYING OUT THE INVENTION

Hereinafter, description will now be given in detail according to exemplary embodiments disclosed herein, with reference to the accompanying drawings.

In the following description, a suffix such as "module" and "unit" may be used to refer to elements or components. Use of such a suffix herein is merely intended to facilitate description of the specification, and the suffix itself is not intended to give any special meaning or function.

Moreover, although the embodiments of the present invention will be described in detail with reference to the accompanying drawings and the disclosure described by the drawings, it is to be understood that the present invention is not limited by such embodiments.

Although the terms used in this specification are selected from generally known and used terms considering their functions in the present invention, the terms may be modified depending on intention of a person skilled in the art, practices, or the advent of new technology.

Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
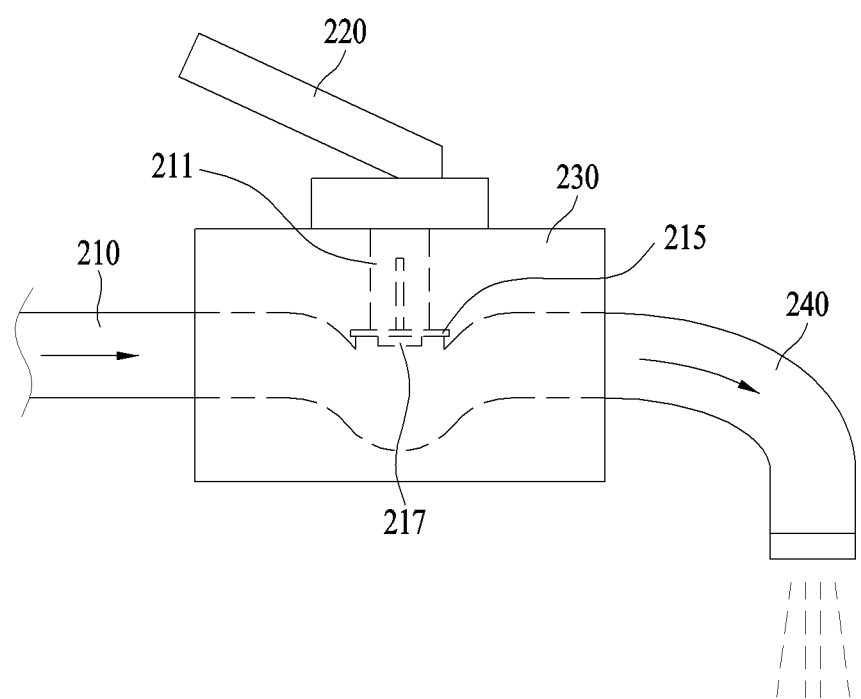
FIG. 1 is a cross-sectional view illustrating a water supply valve according to the related art.
Figure 2B:
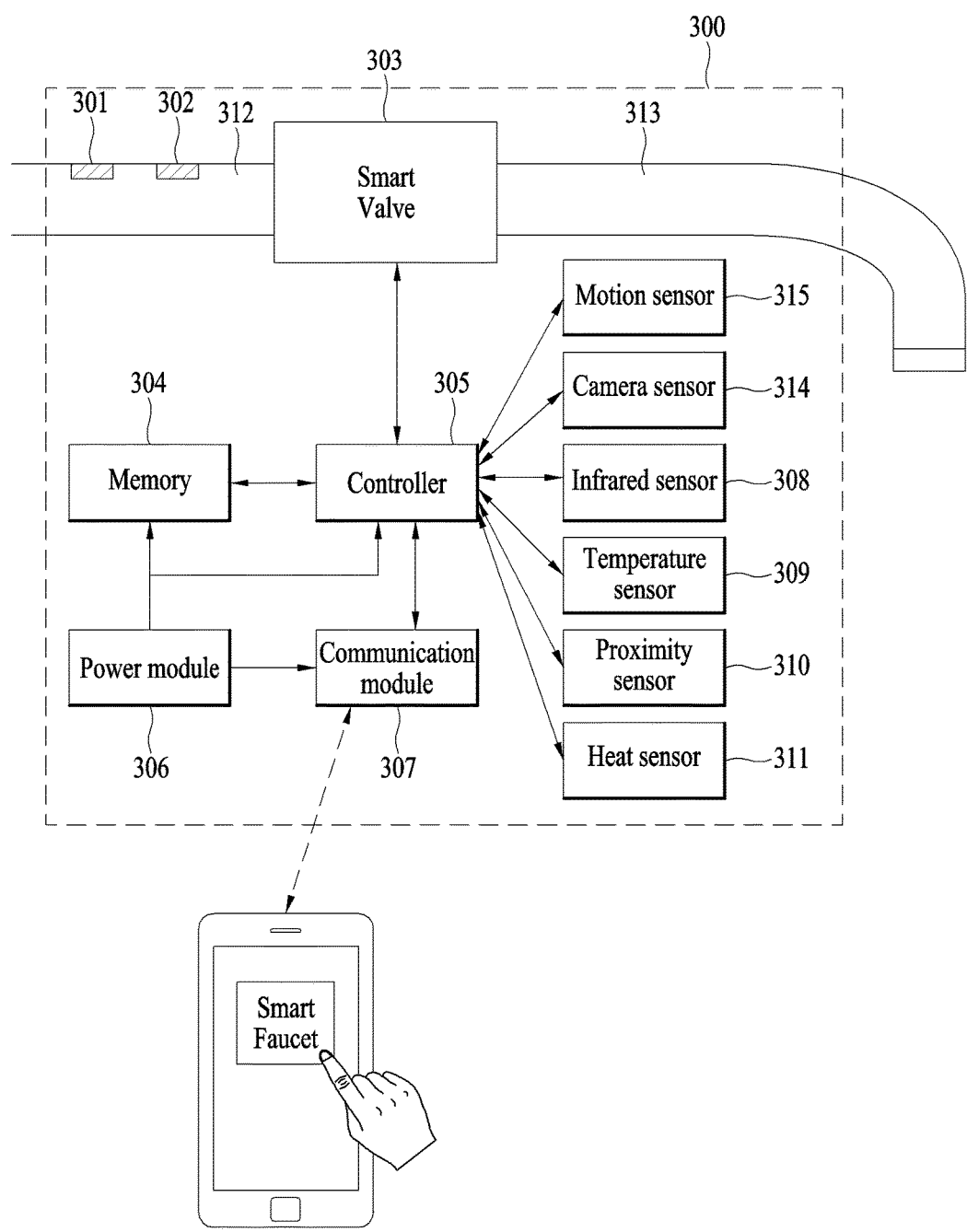
FIG. 2 is a diagram illustrating internal elements of a smart water supply valve system according to one embodiment of the present invention.
Figure 2C:
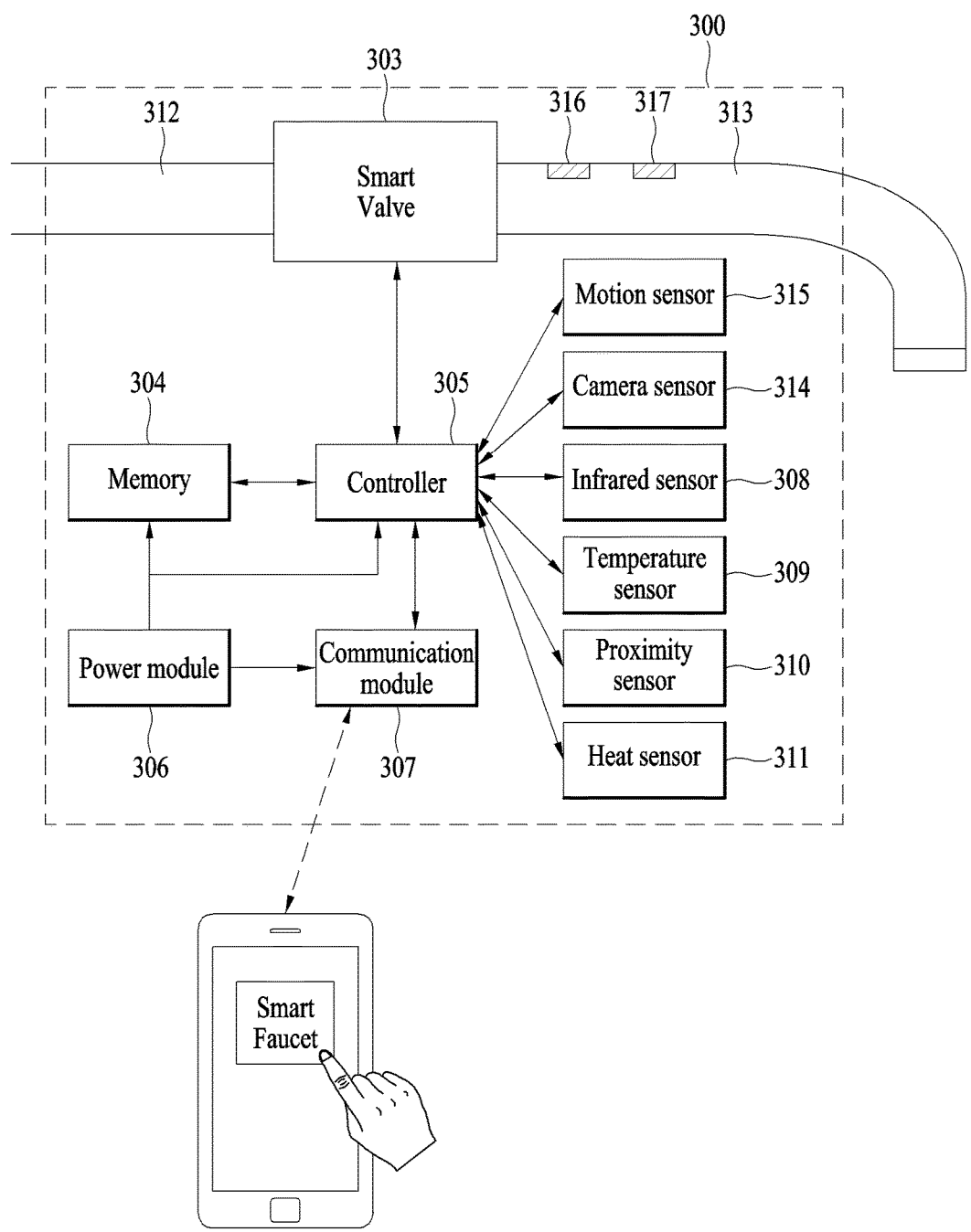

FIG. 2 is a diagram illustrating internal elements of a smart water supply valve system according to one embodiment of the present invention. The person with ordinary skill in the art may implement the present invention by deleting some modules if necessary, and it will be apparent that the scope of the present invention should be determined in accordance with the disclosure cited in claims.

A smart water supply valve system 300 shown in FIG. 2a includes a pressure sensor 301, a flow rate sensor 302, a valve 303, a memory 304, a controller 305, a power module 306, a communication module 307, an infrared sensor 308, a temperature sensor 309, a proximity sensor 310, a heat sensor 311, a camera 314, and a motion sensor 315. An inlet 312 for insertion of water through a pipe and an outlet 313 for discharging water may be included in the smart water supply valve system.

Water is supplied to the inlet 312 through one or more pipes, and the valve 303 opens or closes the water input through the inlet 312. There is no any restriction in respect of design of the valve 303, and the valve 303 may be designed mechanically, or electronically, or by software.

A first sensing unit senses pressure or flow rate of the water input through the inlet 312. That is, the first sensing unit corresponds to at least one of the pressure sensor 301 and the flow rate sensor 302 shown in FIG. 2a.

A second sensing unit senses at least one or more of motion, shape and heat distribution of an object, and includes at least one or more of the infrared sensor 308, the temperature sensor 309, the proximity sensor 310, the heat sensor 311, the camera 314, and the motion sensor 315, which are shown in FIG. 2a.

The infrared sensor 308 may recognize an object close thereto by outputting an IR signal in a linear direction, and the temperature sensor 309 is designed to directly check a temperature of a touched object or recognize a temperature of the air, which is varied due to a peripheral object. For example, all objects emit infrared rays, and if a temperature (infrared rays of a long wavelength) is input to the front of the infrared sensor, the infrared sensor 308 senses an object having a temperature of a certain temperature within a measurement range.

The infrared sensor is a sensor that uses infrared rays which are electromagnetic waves having a wavelength corresponding to the outside of a red part in a spectrum of light. The infrared sensor always has a light-receiving portion for receiving light of a certain frequency, but may have a light-emitting portion or not. In the infrared sensor having both a light-receiving portion and a light-emitting portion, infrared rays generated by the light-emitting portion are reflected by colliding with an object, and the light-receiving portion senses variance of the reflected light to discover motion of the object or measures intensity of the reflected light to know a distance to the object.

The proximity sensor 310 also functions similarly to the infrared sensor, and additionally has an advantage in that it can detect an object of a relatively long distance through communication with a peripheral mobile device. The heat sensor 311 functions similarly to the temperature sensor 309.

The motion sensor 315 is designed to recognize motion of an object in more various manners. For example, the motion sensor 315 is designed to identify a case that a user continuously rubs the periphery of the smart water supply valve system, a case that motion of a hand of the user is temporarily stopped, and a case that another object in addition to the hand of the user moves together with the hand of the user (for example, dish-washing), from one another. The motion sensor 315 may be referred to as a motion detecting sensor. Moreover, various modules may be adopted to implement the motion sensor or the motion detecting sensor. For example, if the principle of GPS is applied using three infrared sensors, the motion sensor may measure motion or position of an object on a three-dimensional space.

The controller 305 controls a switching rate of the valve 303 or a flow rate of water on the basis of the output sensed from the first sensing unit and the second sensing unit, and the outlet 313 is a portion where the water supplied from the pipe is discharged out.

Meanwhile, the pipe may be implemented as one pipe, or a first pipe for supplying hot water and a second pipe for supplying cool water may be implemented respectively within the scope of the present invention.

Moreover, the pressure sensor 301 or the flow rate sensor 302 is installed in the inlet 312 and designed to easily sense a pressure or flow rate of the water. Also, the pressure sensor 316 or the flow rate sensor 317 may additionally be installed in the outlet 313 to doubly check a pressure or flow rate of the water. In preparation for failure of the pressure sensors 301 and 316 or the flow rate sensors 302 and 317, according to another characteristic of the present invention, the sensors may be installed in a position (for example, outer pipe) where it is easy to replace the sensors.

If an object is sensed by the infrared sensor 308, the controller 305 controls the outlet 313 to discharge only the fixed amount of water, and if a size or shape of the object is sensed by a camera (not shown), the controller 305 controls the outlet 313 to discharge the water by changing the amount of the water in accordance with the sensed size or shape. More detailed description will be given later with reference to FIGS. 3, 4 and 5.

Meanwhile, if a temperature or peripheral temperature of the object is sensed by the temperature sensor 309, the controller 305 controls the outlet 313 to discharge the water by changing a temperature of the water in accordance with the sensed temperature. More detailed description will be given later with reference to FIGS. 3, 6 and 7.

Moreover, the controller 305 is designed to control a pressure or flow rate of the first pipe for supplying cool water and a pressure of flow rate of the second pipe for supplying hot water, thereby controlling the temperature of the water.

Although not shown in FIG. 2a, the smart water supply valve system according to another embodiment of the present invention further includes a display module for displaying the amount and temperature of the water discharged through the outlet 313. The display module may be designed as LCD or OLED, for example.

Finally, the controller 305 is provided with a function that may in advance reserve the amount and temperature of the water discharged through the outlet 313 by means of the display module (not shown). According to still another embodiment, since the smart water supply valve system 300 further includes a communication module 307, it receives information that may in advance reserve the amount and temperature of the water, from an external mobile device. Therefore, it is advantageous that the smart water supply valve system may be controlled remotely.

That is, as shown in FIG. 2a, the mobile device 350 may control the smart water supply valve system 300 according to one embodiment of the present invention. For example, information for controlling the amount, temperature, time, etc. of the water is received from the mobile device 350 through the communication module 307. To this end, a related application 351 may be stored in a memory of the mobile device 350 as an initial default or may be downloaded by a user through an app store, etc. Two embodiments and a modified embodiment belong to the scope of the present invention. The corresponding embodiments will be described in more detail with reference to FIGS. 8 and 11.

Moreover, FIG. 2a illustrates that the pressure sensor 316 and the flow rate sensor 317 exist in the outlet but do not exist in the inlet. On the contrary, FIG. 2b illustrates that the pressure sensor 316 and the flow rate sensor 317 exist in the inlet but do not exist in the outlet.

FIG. 3 is a diagram illustrating an operation of a smart water supply valve system according to one embodiment of the present invention.

As described above, and as shown in FIG. 3, a smart water supply valve system 400 according to one embodiment of the present invention includes at least one or more sensors. For example, the smart water supply valve system 400 includes at least one of an infrared sensor 421, a camera 422 and a temperature sensor 423, which are shown in FIG. 3.

First of all, as shown in FIG. 3(a), the smart water supply valve system 400 according to one embodiment of the present invention senses an object through the infrared sensor 421. The object corresponds to a body of a user who is close to the smart water supply valve system 400 to wash hands. The infrared sensor 421 may sense an object within a predetermined distance, for example. However, the infrared sensor 421 may only the presence of the object.

Therefore, if the infrared sensor 421 senses the object, as shown in FIG. 3(b), water of a predetermined condition is discharged out. The water of a predetermined condition means water fixed at the amount of A liter and a temperature of B° C. However, a problem occurs in that the water of the fixed amount and temperature cannot reflect requirements of a user. To solve this problem, description according to another embodiment and still another embodiment of the present invention will be given with reference to FIGS. 4 to 7 in more detail.

Meanwhile, the sensors shown in FIG. 3(a) may be designed to be changed to another position in accordance with the need of the person with ordinary skill in the art. Particularly, the temperature sensor 423 does not need to be designed to be arranged at a position similar to those of the other sensors 421 and 422. For example, if the temperature sensor 423 is to directly measure a temperature of an object (for example, user), the temperature sensor 423 is designed to be arranged on an upper end of the smart water supply valve system 400, whereby the user measures an exact body temperature by touching the temperature sensor for a predetermined time and changes a temperature of the water in accordance with the measured result. In this respect, more detailed description will be given with reference to FIGS. 6 and 7.

FIGS. 4 and 5 are diagrams illustrating an operation of a smart water supply valve system according to another embodiment of the present invention. The operation of FIGS. 4 and 5 may be based on FIG. 3 or not.

That is, as shown in FIG. 3, the smart water supply valve system is designed such that the presence of the object is sensed by the infrared sensor 421, and a size (for example, size of hand) of the object is sensed by a camera 522 as shown in FIG. 4(a). The smart water supply valve system may also be designed such that the camera 522 shown in FIG. 4(a) may measure both the presence and size of the object, whereby cost loss due to the infrared sensor may be compensated.

Referring to FIG. 4 again, the smart water supply valve system 500 according to another embodiment of the present invention includes an infrared sensor 521, a camera 522 and a temperature sensor 523. Of course, as described above, the infrared sensor 521 and the temperature sensor 523 may be omitted within the scope of the present invention.

First of all, as shown in FIG. 4(*a*), it is assumed that a shape or size of the object is sensed by the camera 522. For example, as shown in FIG. 4(*a*), if it is determined that the size of the object is A size or more, as shown in FIG. 4(*b*), the amount of the water discharged through the outlet is changed to a C liter, and the temperature of the water is maintained at a temperature of B° C. The C liter shown in FIG. 4 is greater than the A liter shown in FIG. 3. This considers user requirements for requiring a relatively large amount of water when the size of the object is relatively great. However, the smart water supply valve system is designed such that the temperature of the water is not changed. To change the temperature of the water, the operation of the temperature sensor 523 is required. The operation of the temperature sensor 523 will be described later with reference to FIGS. 6 and 7. Moreover, to implement the embodiment shown in FIG. 4, the amount of the water mapped into the sensed size of the object should previously be stored in the memory of the smart valve system.

On the other hand, FIG. 5 relates to an embodiment contrary to the status of FIG. 4. First of all, as shown in FIG. 5(*a*), the smart water supply valve system includes an infrared sensor 621, a camera 622, and a temperature sensor 623, and may be designed such that some of the sensors may be used in accordance with the need of the person with ordinary skill in the art.

And, as shown in FIG. 5(*a*), it is assumed that a shape or size of the object is sensed by the camera 622. For example, as shown in FIG. 5(*a*), if it is determined that the size of the object is less than A size, as shown in FIG. 5(*b*), the amount of the water discharged through the outlet is changed to a D liter, and the temperature of the water is maintained at a temperature of B° C. The D liter shown in FIG. 5 is smaller than the A liter shown in FIG. 3. This considers user requirements for requiring a relatively small amount of water when the size of the object is relatively small. However, the smart water supply valve system is designed such that the temperature of the water is not changed. To change the temperature of the water, the operation of the temperature sensor 623 is required. The operation of the temperature sensor 623 will be described later with reference to FIGS. 6 and 7. Moreover, to implement the embodiment shown in FIG. 5, the amount of the water mapped into the sensed size of the object should previously be stored in the memory of the smart valve system.

FIGS. 6 and 7 are diagrams illustrating an operation of a smart water supply valve system according to other embodiment of the present invention. The embodiments of FIGS. 6 and 7 are based on the embodiment of FIG. 3, FIG. 4 or FIG. 5.

That is, as described with reference to FIG. 3, the presence of the object is sensed by the infrared sensor 421, or as described with reference to FIGS. 4 and 5, the presence of the object is sensed by the cameras 522 and 622.

Based on that the presence of the object is sensed by the corresponding camera, referring to FIG. 6 again, the smart water supply valve system 700 according to other embodiment of the present invention includes an infrared sensor 721, a camera 722 and a temperature sensor 723. Of course, as described above, any one of the infrared sensor 721 and the camera 722, and the temperature sensor 723 may be used within the scope of the present invention.

First of all, as shown in FIG. 6(*a*), it is assumed that the temperature of the object is sensed by the temperature sensor 723. For example, as shown in FIG. 6(*a*), if it is determined that the temperature of the object is A temperature or more, as shown in FIG. 6(*b*), the amount of the water discharged through the outlet is maintained at A liter, whereas the temperature of the water is changed to a temperature of E° C. The temperature of E° shown in FIG. 6 is lower than the temperature of B° C. shown in FIG. 3. This considers user requirements for requiring a relatively low temperature of water when the temperature of the object is high. Moreover, to implement the embodiment shown in FIG. 6, the temperature value of the water mapped into the sensed temperature of the object should previously be stored in the memory of the smart valve system.

Meanwhile, as a method for sensing a temperature of an object through the temperature sensor 723, two embodiments may be considered.

First of all, as the first embodiment, there may be a method for allowing an object (for example, user) to directly touch the temperature sensor 723. In this case, it is required to design the smart valve system 700 such that the temperature sensor 723 is arranged on the smart valve system to allow a user to easily touch the temperature sensor 723.

As a second embodiment, even though the object does not directly touch the temperature sensor 723, if the object is close to the temperature sensor 723, a peripheral temperature is changed necessarily. The temperature sensor 723 can estimate the temperature of the object by sensing the changed peripheral temperature.

On the other hand, FIG. 7 relates to an embodiment contrary to the status of FIG. 6. First of all, as shown in FIG. 7(*a*), the smart water supply valve system 800 includes an infrared sensor 821, a camera 822, and a temperature sensor 823, and may be designed such that some of the sensors may be used in accordance with the need of the person with ordinary skill in the art.

And, as shown in FIG. 7(*a*), it is assumed that a temperature of an object is sensed by the temperature sensor 823. For example, as shown in FIG. 7(*a*), if it is determined that the temperature of the object is less than A° C., as shown in FIG. 7(*b*), the amount of the water discharged through the outlet is maintained, whereas the temperature of the water is changed to a temperature of F°. The temperature of F° C. shown in FIG. 7 is relatively higher than the temperature of B° C. shown in FIG. 4. This considers studies that the temperature of the water should be relatively high when the temperature of the object is relatively low. Moreover, to implement the embodiment shown in FIG. 7, the temperature value of the water mapped into the sensed temperature (or peripheral temperature) of the object should previously be stored in the memory of the smart valve system 800.

In short again, to implement the embodiments of FIGS. 4 to 7, information or table listed in Table 1 below should previously be stored in the memory of the smart water supply valve system according to one embodiment of the present invention. Of course, the smart water supply valve system designed to allow a user to directly set such information pertains to the scope of the present invention.

TABLE 1

| Object | Amount of water | Temperature of water |
|---|---|---|
| Sensing of 'a' size or more | C liter | Fixed |
| Sensing less than 'a' size | D liter | Fixed |
| Sensing of 'b' temperature or more | Fixed | E ° C. |
| Sensing less than 'b' temperature | Fixed | F ° C. |
| Sensing of 'c' shape | G liter | Fixed |
| Sensing of 'd' shape | H liter | Fixed |

TABLE 2

| User mode | Amount of water | Temperature of water |
|---|---|---|
| First user mode | A liter | a ° C. |
| Second user mode | B liter | b ° C. |
| Third user mode | C liter | c ° C. |
| Fourth user mode | D liter | d ° C. |
| Fifth user mode | E liter | e ° C. |
| Sixth user mode | F liter | f ° C. |

Meanwhile, as illustrated in Table 2, the smart water supply valve system according to other embodiment of the present invention stores information on the amount and temperature of water per user mode.

For example, the first user mode corresponds to a case that a user takes a shower. To implement this mode, if a position of the user is sensed through the proximity sensor or the infrared sensor, which is arranged near a bathtub or shower tap and a temperature of the user is sensed through the temperature sensor or the heat sensor, water of a temperature inversely proportional to the sensed temperature is discharged out.

Meanwhile, the second user mode corresponds to a case that a cup is arranged on a wash stand. To implement this mode, a camera arranged near the wash stand is designed to sense a shape and size of the cup, and is controlled to discharge only the amount of water suitable for the size of the cup.

Moreover, the third user mode corresponds to a case that a toothbrush is arranged on the wash stand. To implement this mode, a camera arranged near the wash stand is designed to sense a shape of the toothbrush, and is controlled to discharge only the amount of water smaller than the amount of water of the second user mode.

The person with ordinary skill in the art may apply another user mode with reference to the first to third user modes within the scope of the present invention.

Figure 8:
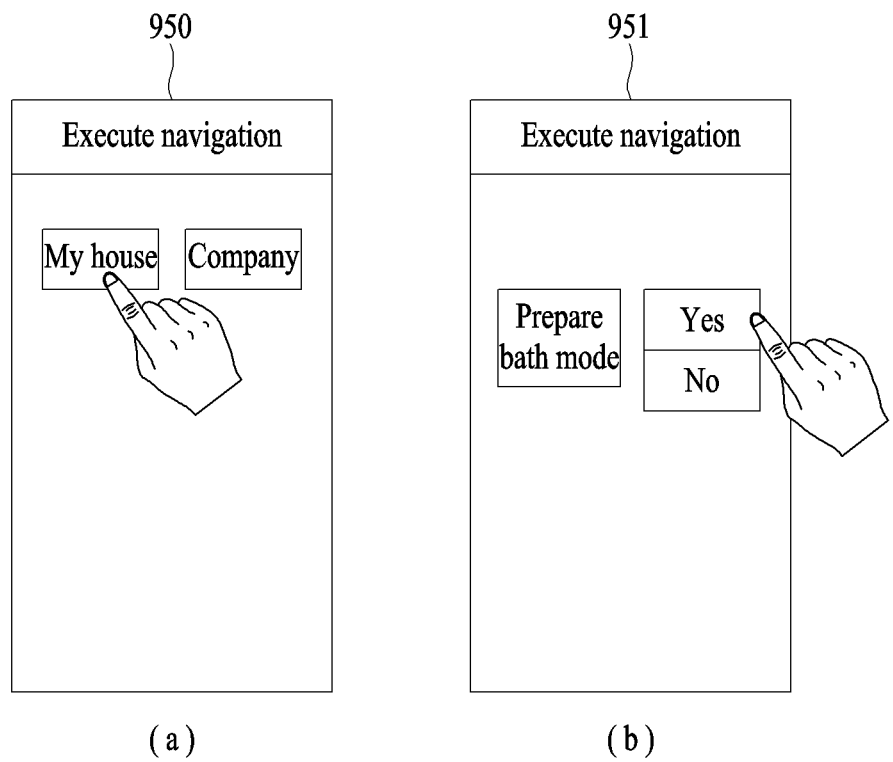
FIG. 8 is a diagram illustrating a process of controlling a smart water supply valve system through a mobile device according to one embodiment of the present invention.

FIG. 8 is a diagram illustrating a process of controlling a smart water supply valve system through a mobile device according to one embodiment of the present invention. The person with ordinary skill in the art may complementarily construe FIG. 8 with reference to the previous drawings.

First of all, it is considered that various sensors are used as a method for sensing an object (ex: user, object, etc.) in the previous drawings. Moreover, after an application program is downloaded in the mobile device, the smart water supply valve system according to one embodiment of the present invention may remotely be controlled. To this end, the system 300 of FIG. 2 includes a communication module 307, and may perform communication with an external mobile device.

Meanwhile, three embodiments for remotely controlling the smart water supply valve system according to one embodiment of the present invention through the mobile device may be provided.

As the first embodiment, the user may directly input the amount, temperature and time of the water discharged from the smart water supply valve system by using the mobile device.

As the second embodiment, if the user inputs a specific mode more simply by using the mobile device, information on the input mode is transmitted to the smart water supply valve system. The smart water supply valve system that has received the information executes a function according to the specific mode. For example, if a dad mode is input, water that may be immersed in half in the bathtub at a corresponding temperature for a given time is discharged from the smart water supply valve system. On the other hand, if a daughter mode is input, water that may fully be immersed in the bathtub at another temperature for a given time is discharged from the smart water supply valve system. Therefore, according to one characteristic of the present invention, it is designed such that a table for mode determination is previously stored in the memory of the smart water supply valve system.

The third embodiment will be described with reference to FIG. 8. As shown in FIG. 8(a), it is assumed that a mobile device 950 executes navigation and sets 'my house' to a destination. At this time, as shown in FIG. 8(b), a mobile device 951 outputs a message for requiring whether to prepare for a bath mode. If the user selects the bath mode, the mobile device calculates an estimated arrival time from the current position to the destination 'house' and transmits time information to the smart water supply valve system.

The smart water supply valve system that has received the time information is designed to fill the bathtub with the amount of water and a temperature, which are set by the user. Particularly, the smart water supply valve system according to another embodiment of the present invention automatically changes the temperature on the basis of the time information. For example, if the arrival time of the user is delayed, the smart water supply valve system is designed such that the temperature of the water is relatively more increased than the preset temperature. On the other hand, if the arrival time of the user is faster than the estimated time, the smart water supply valve system is designed to relatively lower the temperature of the water.

Meanwhile, a temperature controller for controlling the temperature of the water which is discharged may additionally be designed, and automatically controls an input ratio of hot water and cool water.

Also, the smart water supply valve system according to another embodiment of the present invention further includes a display module for displaying an output ratio or temperature of water, and additionally includes a setup module for previously reserving and controlling the amount ratio or temperature of water. Moreover, information on the usage amount or average temperature of water for a preset time period is transmitted to the aforementioned mobile device or recorded in the memory.

The smart water supply valve system according to another embodiment of the present invention may be used by combination of different sensors in accordance with purpose of use for kitchen, bathroom, etc. For example, a system for a kitchen, which frequently uses water and of which water temperature is relatively less important, includes an infrared sensor and a camera except a temperature sensor. A system for a bathroom of which water temperature is relatively more important includes an infrared sensor and a temperature sensor except a camera. As a result, it is expected that unnecessary cost may be reduced.

Figure 9:
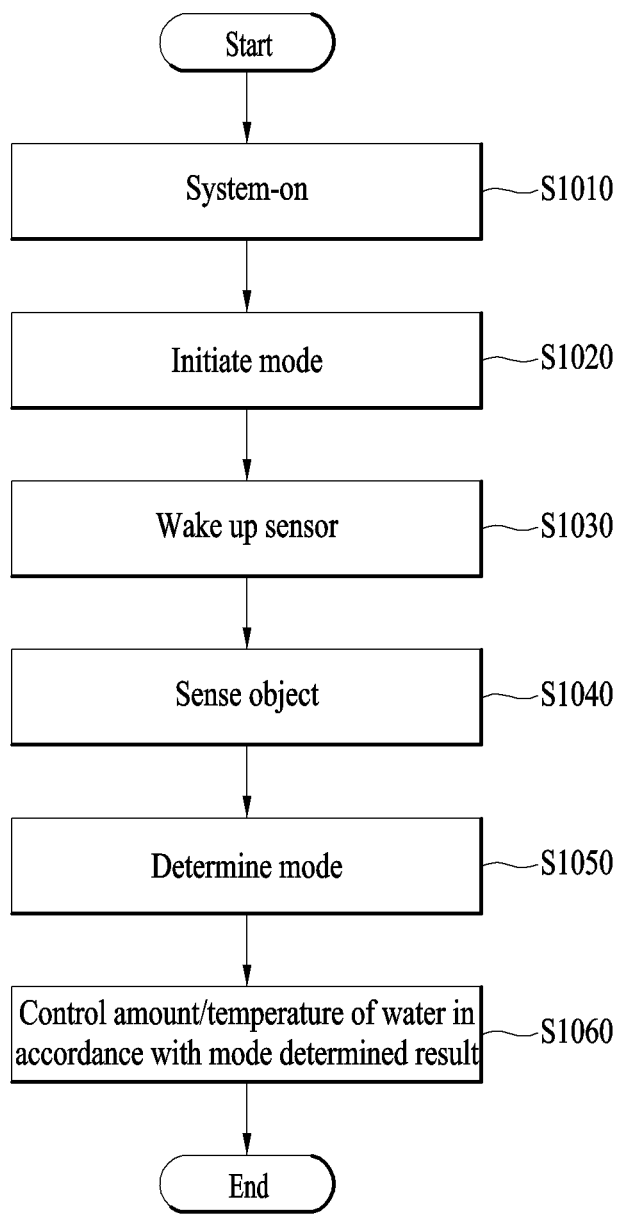
FIG. 9 is a flow chart illustrating a method for controlling a smart water supply valve system according to one embodiment of the present invention.

FIG. 9 is a flow chart illustrating a method for controlling a smart water supply valve system according to one embodiment of the present invention. Of course, another embodiment may be implemented with reference to FIG. 2 and the previous drawings within the scope of the present invention.

First of all, as shown in FIG. 9, the smart water supply valve system is turned on (S1010). For example, the smart water supply valve system of the present invention is operated from the time when a power source is supplied. And, a mode of the smart water supply valve system is reset (S1020). If necessary, some unnecessary data stored in the memory may be deleted.

The aforementioned sensors (pressure sensor, flow rate sensor, temperature sensor, infrared sensor, etc.) are woken up to minimize unnecessary power consumption (S1030).

Moreover, the woken-up sensors sense an object (S1040), and determines a user mode on the basis of the sensed result value (S1050). The amount and temperature of water discharged from the outlet are controlled in accordance with the determined result of the user mode (S1060). The step S1050 will be described later in more detail with reference to FIG. 10.

Figure 10:
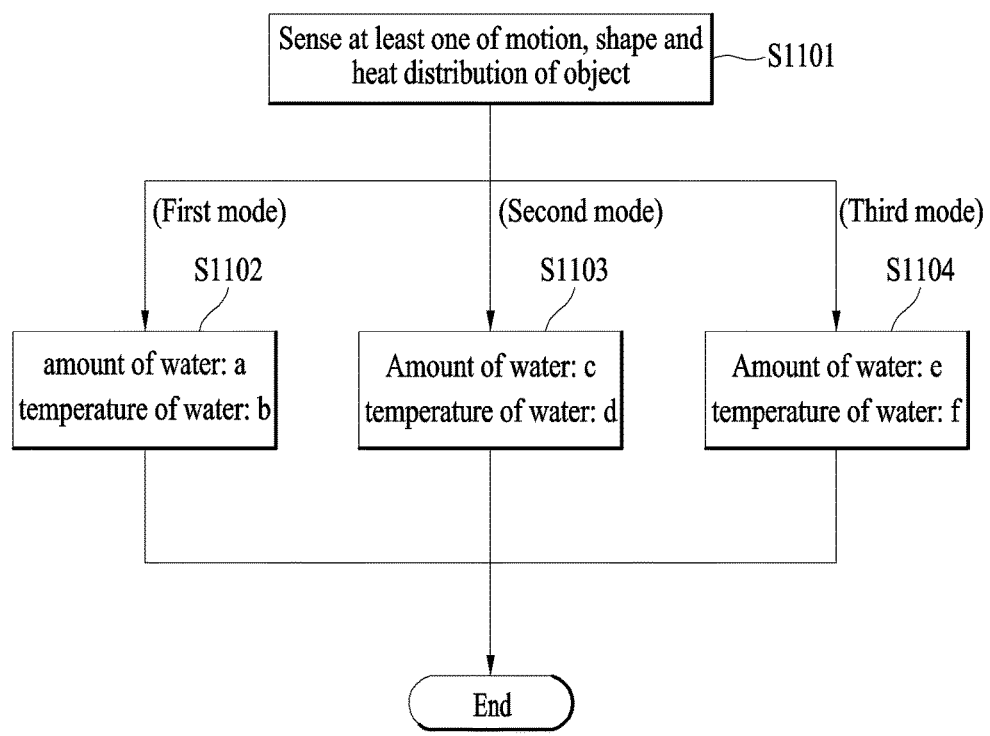
FIG. 10 is a flow chart illustrating a step S1050 shown in FIG. 9 in more detail.

FIG. 10 is a flow chart illustrating a step S1050 shown in FIG. 9 in more detail.

First of all, at least one of motion, shape and heat distribution of the object is sensed by the sensors (S1101), and a user mode is determined in accordance with the sensed result. Since the user mode has been described in detail with reference to Table 2, the user mode may be complementarily construed with reference to Table 2.

If the first mode is determined, the amount of water and a temperature of water are automatically controlled to 'a' liter and 'b° C.', respectively (S1102). If the second mode is determined, the amount of water and a temperature of water are automatically controlled to 'c' liter and 'd° C.', respectively (S1103). If the third mode is determined, the amount of water and a temperature of water are automatically controlled to e' liter and 'f° C.', respectively (S1104). The infrared sensor of the related art has a problem in that water of a fixed temperature and a fixed amount is discharged for a preset time period, whereas the present invention has a technical effect in that the amount and temperature of water may be controlled by being optimized for requirements of a user.

The present invention will be described in short with reference to FIG. 2.

The inlet 312 is supplied with water through one or more pipes, and the valve 303 is designed to open or close the water input through the inlet 312. The pressure sensor 301 or the flow rate sensor 302 senses the pressure or flow rate of the water input through the inlet 312, and the infrared sensor 308 senses at least one of motion, shape and heat distribution of the object.

The controller 305 controls a switching rate of the valve 303 or a flow rate of water on the basis of the output sensed from the first sensing units 301 and 302 and the second sensing units 308, 309, 310 and 311. Finally, the outlet 313 discharges the water supplied from the pipes. The pressure sensor 301 or the flow rate sensor 302 is designed to be installed in the inlet 312 or the outlet 313 or near the valve 303 to improve efficiency of pressure sensing and flow rate sensing.

Although the infrared sensor, the camera and the temperature sensor are shown in FIGS. 3 to 7, the present invention may be implemented to include a proximity sensor and a heat sensor. Unlike the aforementioned pressure sensor 301 and the aforementioned flow rate sensor 302, the second sensing units 308, 309, 310 and 311 may be installed near the outlet 313, whereby it is advantageous that efficiency of sensing may be improved and unnecessary additional design may be avoided.

The controller 305 determines a user mode in accordance with the output of the second sensing unit, and variably controls a switching rate of the valve 303 or a flow rate of water in accordance with the user mode. The user mode is variably changed depending on a temperature, size, shape, etc. of an object which is recognized. This has been described in detail with reference to FIGS. 3 to 7.

The smart water supply valve system 300 according to another embodiment of the present invention additionally includes a valve 303, sensors 301, 302, 308, 309, 310 and 311, or a power module 306 for supplying a power to the controller 305. The communication module 307 performs a function of receiving a control command from the outside or transmitting internal data to the outside. A general water supply valve according to the related art does not include a separate power module or a separate communication module.

Moreover, although the inlet 312 is shown in FIG. 2 as one module, according to another embodiment of the present invention, a hot water inlet supplied with hot water from the pipe, a cool water inlet supplied with cool water from the pipe, a mixing water unit where the cool water and the cool water are mixed with each other, and a temperature sensor installed in the mixing water unit to measure a temperature of mixing water are additionally provided. Therefore, a ratio of the cool water and the hot water may be controlled more easily.

Moreover, although not shown in FIG. 2, the smart water supply valve system according to another embodiment of the present invention further comprises a display module for displaying a switching rate of the valve 303, a flow rate of water, a temperature of water or user mode. Also, the smart water supply valve system further comprises a valve electric driving module (not shown) for performing a switching operation of the valve, and a manual switching module (not shown) for manually switching the valve.

The controller 305 provides a function of previously reserving and setting the amount and temperature of water discharged through the outlet 313, and the communication module 307 receives information, which may previously reserve the amount and temperature of water, from the mobile device. The mobile device has been described in FIG. 8.

Figure 11:
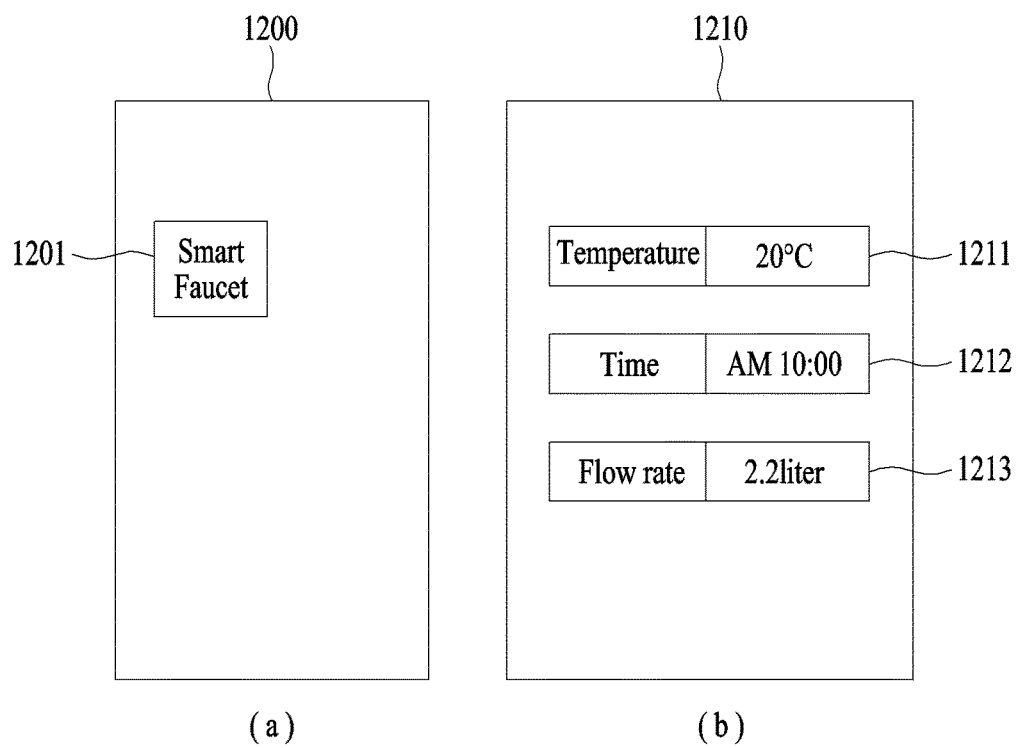
FIG. 11 is a diagram illustrating a process of controlling a smart water supply valve system through a mobile device according to another embodiment of the present invention.

FIG. 11 is a diagram illustrating a process of controlling a smart water supply valve system through a mobile device according to another embodiment of the present invention. FIG. 8 illustrates that a user simply selects a specific mode. In the embodiment of FIG. 11, which will be described later, an option that may allow a user to select a desired temperature, time and flow rate of water in more detail is provided.

First of all, as shown in FIG. 11(a), a mobile device 1200 stores an application 1201, which may control the smart water supply valve system according to one embodiment of the present invention, in a memory. Of course, the mobile device 1200 may be designed to be selectively downloaded by a user within the scope of the present invention.

Therefore, if a user selects and executes a specific application 1201 shown in FIG. 11(a), the mobile device 1210 displays various options as shown in FIG. 11(b).

For example, a first option 1211 corresponds to a function for selecting a temperature of water, a second option 1212 corresponds to a function for selecting a discharging time of water, and a third option 1213 corresponds to a function for selecting a flow rate of water. Although not shown in FIG. 11, the mobile device may be designed to allow a user to select a start time and an end time for discharging water within the scope of the present invention.

FIG. 12 is a diagram illustrating a process of controlling water in accordance with an object recognized in a smart water supply valve system according to still another embodiment of the present invention.

Although it is assumed that a person among objects is sensed in the previous drawings, the smart water supply valve system may be designed such that a thing among objects may be sensed and thus another water may be discharged.

For example, as show in FIG. 12(a), the smart water supply valve system 1300 comprises a plurality of sensors 1321, 1322 and 1323 as described in detail in the previous drawings. For example, if a shape and size of a cup is recognized by a camera 1322, the smart water supply valve system is controlled to discharge only water corresponding to the recognized shape and size. For example, the amount of water corresponding to the recognized cup size is Y liter and related information is previously stored in the memory.

On the other hand, as shown in FIG. 12(b), if a shape and size of a toothbrush are recognized by the camera of the smart water supply valve system, the smart water supply valve system is controlled to discharge water for a very short time period. For example, the amount of water corresponding to the recognized toothbrush is X liter and is smaller than the Y liter, whereby related information is stored in the memory.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

MODE FOR IMPLEMENTING THE INVENTION

Since the mode for implementing the invention has been sufficiently described in the best mode for carrying out the invention, the mode for implementing the invention may be modified and designed in other forms by the person with ordinary skill in the art.

INDUSTRIAL APPLICABILITY

Since the present invention is applicable to a mobile device as well as a water supply valve system, its industrial applicability is admitted.

The invention claimed is:

1. A smart water supply valve system comprising:
an inlet supplied with water through one or more pipes;
a valve configured to open or close water input through the inlet;
a first sensing unit configured to sense a pressure or a flow rate of water input through the inlet;
a second sensing unit configured to sense a size of an object and at least one of a motion, a shape and a heat distribution of an of the object;
an outlet configured to discharge water supplied from the one or more pipes; and
a controller configured to:
control a switching rate of the valve or the flow rate of water on the basis of an output of the first sensing unit and an output of the second sensing unit,
determine a user mode in accordance with the output of the second sensing unit,
when the user mode is a first mode, cause the valve to change an amount of water discharged to a first unit amount, and maintain a temperature of the water at a first predetermined temperature, and
when the user mode is a second mode, cause the valve to change the amount of water discharged to a second unit amount, and maintain the temperature of the water at a second predetermined temperature,
wherein the second sensing unit includes a camera and at least one of an infrared sensor, a first temperature sensor, a heat distribution sensor and a proximity sensor,
wherein the first mode indicates that the size of the object is more than a predetermined size, and
wherein the second mode indicates that the size of the object is less than the predetermined size.

2. The smart water supply valve system according to claim 1, wherein the first sensing unit includes at least one of a pressure sensor and a flow rate sensor.

3. The smart water supply valve system according to claim 2, wherein the pressure sensor or the flow rate sensor is installed in at least one of the inlet, the outlet and the valve, through which water passes.

4. The smart water supply valve system according to claim 1, wherein the infrared sensor, the first temperature sensor, the proximity sensor, the heat distribution sensor or the camera is installed near the outlet through which water is discharged.

5. The smart water supply valve system according to claim 1, further comprising a power module configured to supply a power source to the valve, the first sensing unit, the second sensing unit or the controller.

6. The smart water supply valve system according to claim 5, further comprising a communication module configured to receive a control command from the outside or transmitting internal data to the outside.

7. The smart water supply valve system according to claim 1, wherein the inlet further includes a hot water inlet supplied with hot water from the one or more pipes, a cool water inlet supplied with cool water from the one or more pipes, a mixing water unit where the hot water and the cool water are mixed with each other, and a second temperature sensor installed in the mixing water unit to measure a temperature of the mixed water.

8. The smart water supply valve system according to claim 5, further comprising a display module configured to display the switching rate of the valve, the flow rate of water, the temperature of the water, or the user mode.

9. The smart water supply valve system according to claim 5, further comprising a valve electric driving module configured to perform a switching operation of the valve.

10. The smart water supply valve system according to claim 5, further comprising a manual switching module configured to manually switch the valve.

11. The smart water supply valve system according to claim 8, wherein the controller provides a function to previously reserve and set the amount of water and the temperature of the water discharged through the outlet.

12. The smart water supply valve system according to claim 6, wherein the communication module receives information to previously reserve and set the amount of water and the temperature of the water, from a mobile device.

13. A method for controlling a smart water supply valve system, the method comprising:
sensing that water enters an inlet;
sensing a pressure or a flow rate of the water entering the inlet via a first sensing unit;
sensing a size of an object and at least one of a motion, a shape and a heat distribution of of the object via a second sensing unit;

selecting a user mode based on the size of the object, the sensed motion, the shape or the heat distribution of the object;

when the user mode is a first mode, causing a valve to change an amount of water discharged to a first unit amount, and maintaining a temperature of the water at a first predetermined temperature; and when the user mode is a second mode, causing the valve to change the amount of water discharged to a second unit amount, and maintaining the temperature of the water at a second predetermined temperature, wherein the second sensing unit includes a camera and at least one of an infrared sensor, a temperature sensor, a heat distribution sensor and a proximity sensor, wherein the first mode indicates that the size of the object is more than a predetermined size, and wherein the second mode indicates that the size of the object is less than the predetermined size.

14. The method according to claim 13, wherein causing the valve to change the amount of water discharged includes variably controlling the amount of water by controlling a discharging time of the water or a switching rate of the valve.

15. The method according to claim 13, wherein causing the valve to change the amount of water discharged includes variably controlling the temperature of water by controlling at least one of a switching rate of a hot water valve and a switching rate of a cool water valve.

16. The method according to claim 13, further comprising displaying information on an accumulated usage of water for a specific time period and an average temperature of water for a specific time period.

17. The method according to claim 13, further comprising receiving a control command from an external device or transmitting internal data stored in a memory to the external device through a communication module.

* * * * *